(12) United States Patent
Andrews et al.

(10) Patent No.: US 8,429,600 B2
(45) Date of Patent: Apr. 23, 2013

(54) DISTRIBUTED COLLABORATIVE ENVIRONMENT DEFINITION SYSTEM AND METHOD

(75) Inventors: William Andrews, Orlando, FL (US); Darren Humphrey, Orlando, FL (US); Joe Swinski, Lake Mary, FL (US); Benjamin Baker, Oviedo, FL (US); Chris Van Duyne, Orlando, FL (US); Derek Minton, Longwood, FL (US)

(73) Assignee: The DISTI Corporation, Orlando, FL (US)

( * ) Notice: Subject to any disclaimer, the term of this patent is extended or adjusted under 35 U.S.C. 154(b) by 456 days.

(21) Appl. No.: 12/878,369

(22) Filed: Sep. 9, 2010

(65) Prior Publication Data

US 2011/0067002 A1 Mar. 17, 2011

Related U.S. Application Data

(60) Provisional application No. 61/241,127, filed on Sep. 10, 2009.

(51) Int. Cl.
*G06F 9/44* (2006.01)
(52) U.S. Cl.
USPC .......................... 717/108; 717/102; 717/110
(58) Field of Classification Search .................. None
See application file for complete search history.

(56) References Cited

U.S. PATENT DOCUMENTS

| 7,895,563 B2 * | 2/2011 | Carlson et al. ................ 717/102 |
| 2005/0015357 A1 * | 1/2005 | Shahidi ............................ 707/1 |
| 2005/0216429 A1 * | 9/2005 | Hertz et al. ....................... 707/1 |
| 2007/0074158 A1 * | 3/2007 | Robinson ....................... 717/110 |
| 2008/0133558 A1 * | 6/2008 | Carlson et al. ................ 707/100 |
| 2008/0243521 A9 | 10/2008 | Coale et al. |
| 2008/0282242 A1 | 11/2008 | Dillenberger et al. |
| 2009/0077463 A1 | 3/2009 | Koster |
| 2009/0164972 A1 * | 6/2009 | Ruan et al. .................... 717/108 |
| 2009/0187389 A1 | 7/2009 | Dobbins et al. |

OTHER PUBLICATIONS

Cicso Systems, "Reusable Learning Object Strategy: Designing and Developing Learning Objects for Multiple Learning Approaches," 2003, pp. 1-34, downloaded from the Internet: <url> http://www.e-novalia.com/materiales/RLOW_07_03.pdf.*
Jacek Chmielewski, "Interaction Interfaces for Unrestricted Multimedia Interaction Descriptions," 2008, Department of Information Technology, PoznaUniversity of Economics, pp. 397-400, downloaded from ACM Digital Library.*

* cited by examiner

*Primary Examiner* — Thuy Dao
*Assistant Examiner* — Stephen Berman
(74) *Attorney, Agent, or Firm* — Gray Robinson, P.A.

(57) ABSTRACT

A system and method for generating a reusable virtual environment item to be integrated into a visual computer simulation using data gathered from a plurality of developers, comprising a centralized knowledge management module, a plurality of distributed workspaces, a content repository, and a content production tool.

11 Claims, 6 Drawing Sheets

DISTRIBUTED COLLABORATIVE ENVIRONMENT DEFINITION SYSTEM AND METHOD

CROSS-REFERENCE TO RELATED APPLICATION

This application claims the benefit of U.S. Provisional Patent Application No. 61/241,127, filed Sep. 10, 2009, the contents of which are herein incorporated by reference.

BACKGROUND

Presently, separate systems exist for collaborative environments and knowledge management. Each of these systems has its own data representation method and mechanism, which results in inefficiencies and difficulties in integrating these systems.

One of the most difficult and expensive issues in the development of complex visual training products, such as simulations of complex machines, human interfaces and control interface software, is the poor level of communications among the various groups of professionals involved. The involved professionals can include design engineers, production engineers, mechanical CAD operators, developers, fielded system operators, instructional designers, visual engineers, 3D content developers, training application engineers and program managers.

Knowledge transfers between the actual design and production organizations, developers, and those professionals involved in the design and implementation of training solutions involve complex knowledge acquisition and management activities that require sophisticated communications and data management solutions. This is traditionally a source of considerable expense.

The collection and translation of detailed systems knowledge into a form that can be readily used in training systems development requires the coordination of a number of different disciplines that do not share common workflow procedures nor do they typically share a mutually understood taxonomy or toolset within which they can effectively collaborate.

Historically, most of the information flow between these groups has taken the form of traditional documentation and mechanical CAD data, produced by the design engineers, from which the production engineers and process developers must determine how to build the finished product. These groups can use different software tools, which further inhibits communications with training developers who must determine specific characteristics and operational requirements for the related training systems by drawing from multiple data sources and reconciling information conflicts between design data and what was actually built.

Therefore, one of the features of this disclosure is to provide a common representation mechanism for project data, and a way in which the new representation can be used to automate the production of virtual replicas of the described systems.

The foregoing has outlined some of the pertinent benefits of the present disclosure. These benefits should be construed to be merely illustrative of some of the more prominent features and applications of the disclosure. Many other beneficial results can be attained by applying the disclosure in a different manner or modifying features within the scope of the disclosure. Accordingly, other benefits and a fuller understanding of the disclosure may be had by referring to the summary of the invention and the detailed description of the preferred embodiment in addition to the scope of the invention defined by the claims taken in conjunction with the accompanying drawings.

SUMMARY OF THE INVENTION

According to one embodiment of the present disclosure, a system for generating a reusable virtual environment item to be integrated into a visual computer simulation is disclosed. The system comprises a centralized knowledge management module, a plurality of distributed workspaces, a content repository, and a content production tool.

An advantage of the present disclosure may be improved program lifecycle efficiency resulting from the rapid definition of system and build specifications as related to visual environments and interactive simulation modules.

Another advantage may be the integration of content production tool chain and build process into the system to aid in rapid development and testing of complex systems.

Another advantage may be the ability to permit all developers to record their knowledge about a virtual environment to be built in a shared knowledge management module.

The system and process disclosed herein enable a development process whereby all developers record their knowledge about the virtual environment to be built in a shared knowledge management module, a process we refer to as Distributed Collaborative Environment Definition (DCED). After the information is entered into the knowledge management module, an automated content production toolset may be used to create a virtual environment. This process and system may greatly improve the visibility and accessibility of the virtual environment definition data for all developers, which may result in improved efficiency throughout the development process.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference characters refer to similar parts throughout the several views of the drawings.

DETAILED DESCRIPTION OF THE DRAWINGS

The present disclosure relates to a system for generating a reusable virtual environment item to be integrated into a computer simulation. More particularly, the system disclosed herein comprises a centralized knowledge management module, a plurality of distributed workspaces, a content repository, and a content production tool which streamlines the process for generating and developing items which can be integrated into computer simulations.

Figure 1:
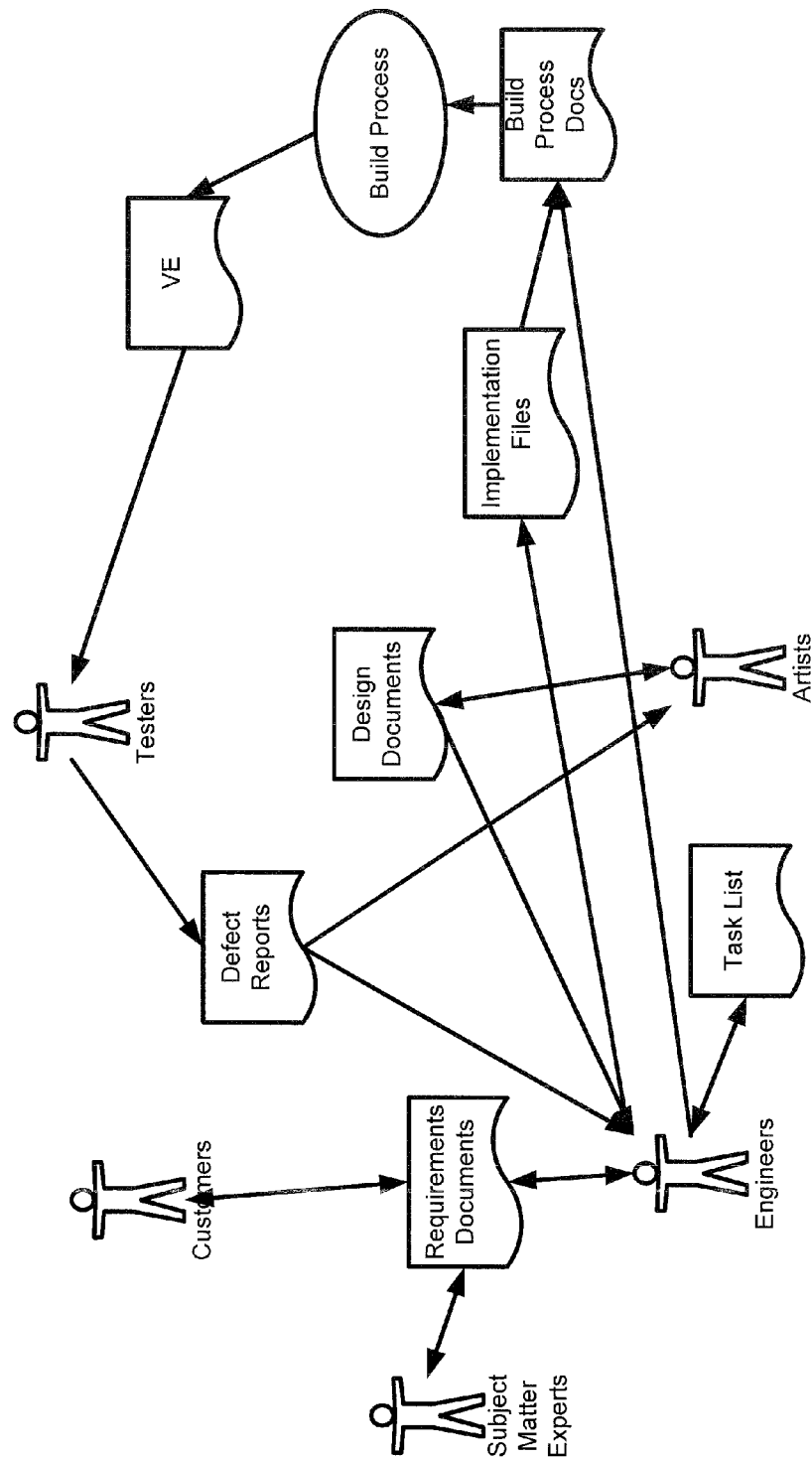
FIG. 1 is a block diagram illustrating a traditional process for developing virtual environment content.

FIG. 1 is an illustration of a traditional process for developing virtual environment ("VE") content. FIG. 1 depicts the issues that arise in the background art in attempting to get information from numerous developers combined in a meaningful fashion so that the information can quickly be used and modified. As shown in FIG. 1, testers, customers, engineers, and artists each have different pieces of information or data to contribute to the working product. Typically, each of these individuals works with tools and technologies specifically designed for their respective subject matter areas. Thus, numerous different data representations and types are used, and they must be assimilated in some fashion. This leads to inefficiencies.

Figure 2:
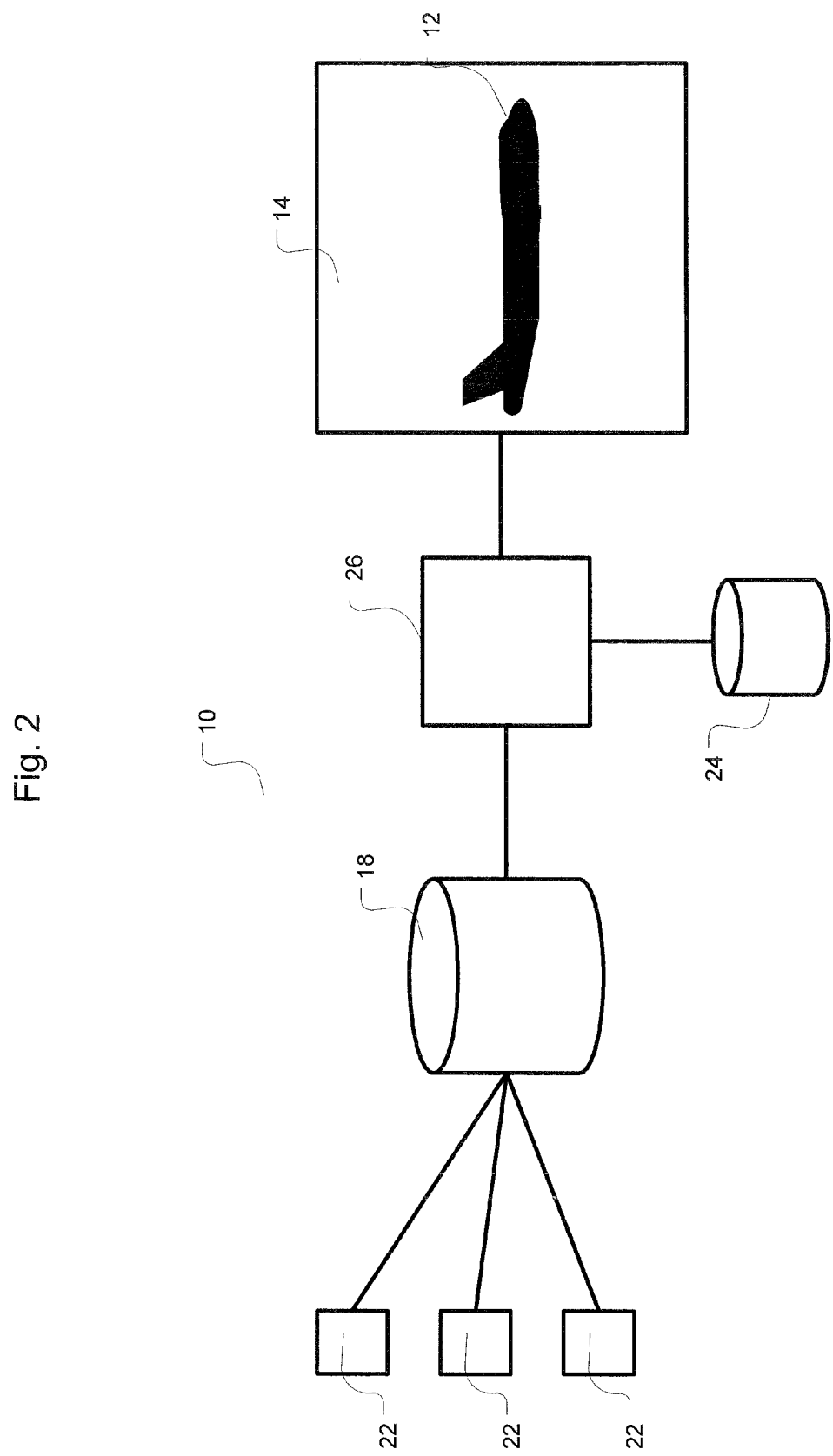
FIG. 2 is a block diagram illustrating one embodiment of a system in accordance with the teachings of the present disclosure.

FIG. 2 is an illustration if the system disclosed herein in a preferred embodiment. The system 10 comprises a centralized knowledge management module 18, a plurality of distributed workspaces 22, a content repository 24 and a content production tool 26. The system 10 generates a reusable virtual environment item 12 which can be integrated into a computer simulation 14.

The computer simulation 14 may be an aircraft maintenance training system which provides a visual representation of an aircraft allowing a student to practice and train on the various maintenance protocols for maintaining an aircraft. Such a system provides a three-dimensional representation of the aircraft and its many components and allows a student to investigate the components of the subject aircraft in a virtual environment, so that the student can learn the details of the aircraft without access to an actual aircraft, which leads to cost savings.

The system 10 disclosed herein may be used to generate components of the aircraft (for instance, a wheel assembly, a heads-up-display, a radar, etc) to be used in the aircraft maintenance training simulator. Because these components are reusable, they can also be used in other computer simulations. For instance, the computer simulation 14 may be a flight simulator for training pilots how to handle and maneuver the aircraft.

For example, the virtual environment item 12 may be an attitude directional indicator ("ADI") for an aircraft. This ADI could be used in an aircraft maintenance trainer to help maintenance students learn to diagnose issues with the component. The ADI could also be used in an aircraft simulator to assist pilots in navigating a simulated aircraft. As would be understood to one skilled in the art, numerous individuals with various expertises are involved in the creation of such a component. Artists contribute graphical expertise and knowledge to the look and feel of the component. A customer provides expertise as to the particularities of the component (i.e. an ADI in one model aircraft will be different from an ADI in another aircraft). A tester may test such a component and verify it conforms to certain requirements, which may change. An engineer may contribute knowledge and expertise to control how the component functions and implementation details of the component. The foregoing list is merely exemplary, as any number of additional participants could be involved in the creation of a virtual environment item 12.

Figure 6:
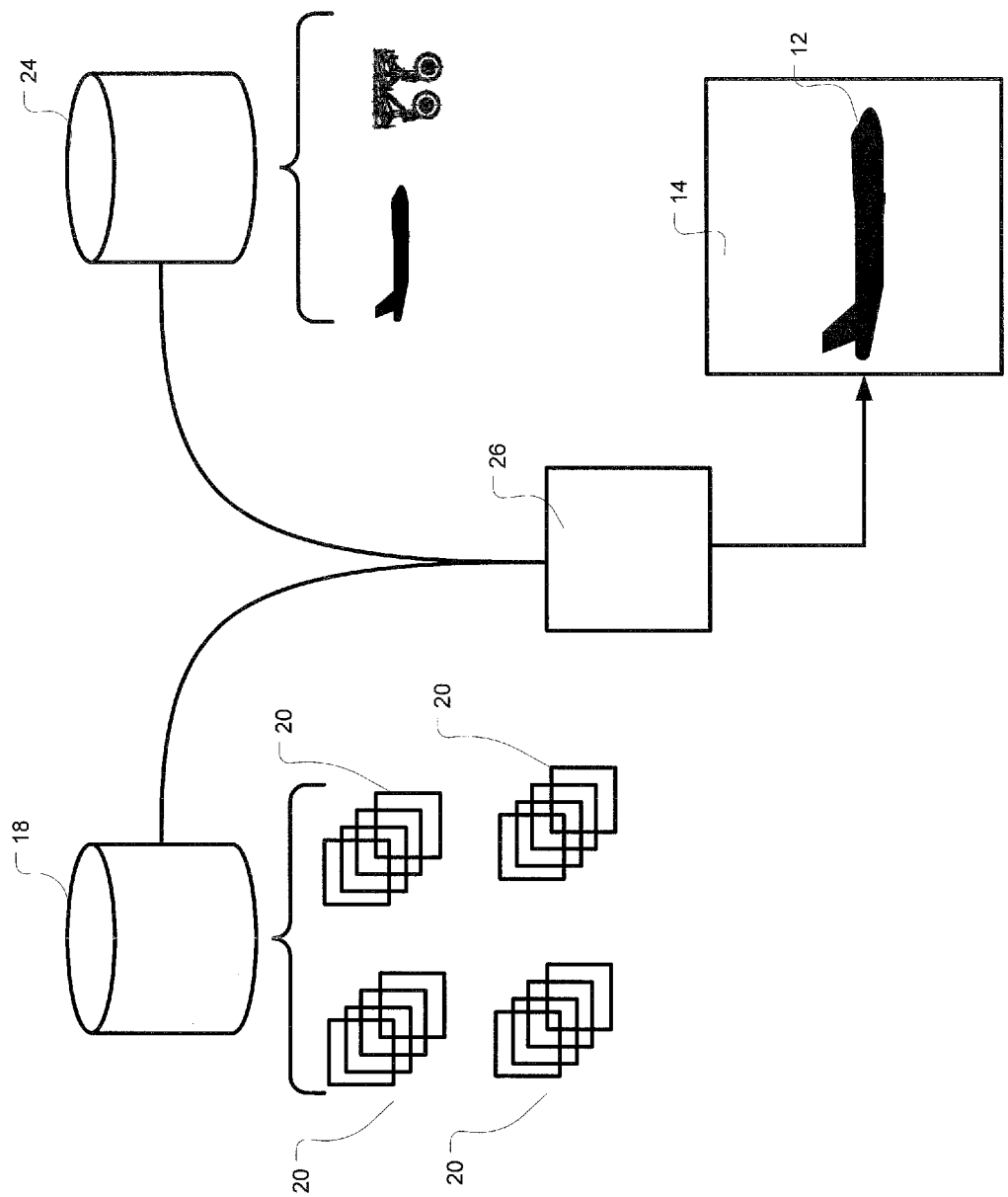
FIG. 6 is a block diagram illustrating one embodiment of components of a system in accordance with the teachings of the present disclosure.

Returning to FIGS. 2 and 3, the knowledge management module is a centralized storage mechanism for storing a plurality of objects 20 (see FIG. 6). Each object belongs to an object class. The use of pre-defined object classes enforces a common representation for all data to be used throughout the system, which improves communication between and among the various contributors to the product.

An object class defines the structure for an object. An object class also may define the underlying data model and the behavior characteristics of the object. This structure can, for instance, be a listing of attributes (for instance, status, behavior, network variables, allowed actions, conditions, etc.) or other features of the particular object. Some attributes may be "type-based" wherein the set of attributes is defined by the type of object. There may also be "global attributes" that can be set on any object, regardless of its type.

The object class may also define build characteristics for the object. For instance, an object may need to be compiled in order to generate a reusable environment item 12 from the object 20, which could be incorporated into a computer simulation 14. There may be certain options that must be provided to an underlying compiler or build engine for objects in a particular object class. By incorporating this information into the object class, the system 10 can automatically perform the build operations (as discussed below) because the knowledge of what build options has already been incorporated into the system 10.

The object class may also define an exporter, defining how data within the class should be extracted from the knowledge management module to be built into an environment item 12. For example, some objects may have external dependencies, such as graphical content elements stored in a content repository 24 (as discussed in more detail below). Other components may have attributes which vary based upon other objects within the component. For instance, the geometry of a component may be changed based on other attributes of the object.

The object class may also define a behavior for an object. Object behavior may be stored through references to scripts and state machines that may be stored outside the knowledge management module 18. Alternatively, such behavior information may be stored in the knowledge management module 18. For instance, the yaw and roll characteristics for an ADI object may be defined, so that as the ADI component moves in the computer simulation 14, proper inputs are provided to the component so that the graphical representation of the component changes to reflect the changes in the virtual aircraft's orientation.

Developers can modify, create and delete object classes as needed. Additionally, the system can convert existing objects into updated class representations. Thus, when an object class is updated, objects of that class are updated to reflect the modification.

In a preferred embodiment, the knowledge management module 18 is a relational database. As would be understood to one of skill in the art, the knowledge management module 18 could be any system for storing information.

A plurality of distributed workspaces 22 can interact with the system 10 herein. Developers use distributed workspaces 22 to input object data into the knowledge management module 18. These distributed workspaces 22 may consult the knowledge management module 18 for the various object classes so that the developers may be presented with a structured data gathering interface by way of the distributed workspaces 22. As would be understood to one of skill in the art, each developer may be presented with a unique workspace 22, or a plurality of developers may share a workspace 22. Because the knowledge management module 18 utilizes objects of defined object classes, and the distributed workspaces 22 enforce these object classes, data consistency may be maintained throughout the system 10.

Numerous workspaces 22 can concurrently interact with the knowledge management module 18. In a preferred embodiment, the system 10 includes revision control capabilities. Thus, while various users are interacting with distributed workspaces 22, they can commit their respective changes into the system 10. Those changes may be available to all other developers working with the system 10. Additionally, the developers may experiment with their proposed modifications in a local environment where the developer's changes will not have any impact on other users of the system 10 until after the developer commits those changes.

By permitting concurrent access to the system, changes made by one developer are immediately available to other developers using the system 10. This permits rapid iteration through changes to the object data within the system 10 to permit quick development and refinement of virtual environment items 12.

The system 10 also provides change tracking functionality, so that changes can be undone if not successful. Additionally, the change tracking functionality permits branching, merging and other revision control capabilities to be integrated into the system.

The system 10 may also provide access control to limit which users can access various data within the system 10. The knowledge management module 18 may provide access control capabilities governing which users can access which data and in which manners. For instance, an artist user may be permitted to alter the graphical information concerning an object 20, but would be precluded from altering the implementation details for the component. Conversely, an engineer user could be permitted to alter the implementation details for a component and precluded from modifying the graphical details for a component.

The distributed workspaces 22 are communicatively connected to the knowledge management module 18. In a preferred embodiment, the workspaces 22 may communicate with the knowledge management module 18 via a network. Preferably, this network may be the Internet. Alternatively, this network may be a private network, or any other computer network. As would be understood to one of skill in the art, the communication path between the workspaces 22 and the knowledge management module 18 may be a secured communication path, such as an encrypted communication path.

The system 10 may also include a content repository 24. The content repository 24 may store graphical information relating to objects within the system 10. For instance, the content repository 24 may store two-dimensional representations for certain components or objects, and three-dimensional representations for certain components or objects. The system 10 may use this graphical information during the build process (discussed below) to generate a reusable virtual environment item 10. As another example, geometry objects may be stored in the content repository 24. The content repository 24 may be any system for storing information, including a file system or database.

The system 10 may also include a content production tool 26 which builds the reusable virtual environment item 12 from the data stored in the knowledge management module 18. Because of the structure data, as discussed above, the content production tool 26 may operate automatically, generating and regenerating the virtual environment item 12 as changes to the data in the knowledge management module 18 are made. This results in significant time savings in the development process as changes to components may be quickly configured, compiled, and integrated into a virtual environment item 12 enabling users of the system 10 to quickly see the effects of those changes.

Alternatively, the content production tool 26 may only build or rebuild the environment item 12 on request. In a preferred embodiment, the content production tool 26 may comprise a build system for selecting components from the knowledge management module 18 and building them into a reusable virtual environment item 12.

In one embodiment, a list of objects to be built is generated. This list of objects may be generated automatically or may be created by a user. This list of objects may contain sufficient instructions to enable the content production tool 26 to gather the necessary information from the knowledge management module 18 to generate a virtual environment item 12. For example, the list of objects may be all objects necessary to build the ADI component discussed above. The content production tool 26 would use this list to gather all object data needed from the knowledge management module 18, and all external content needed from the content repository 24 to generate a virtual ADI.

Components within the system 10 can be collections of objects 20. Thus, the ADI example used above maybe a component comprising a number of objects stored in the knowledge management module 18. The system 10 may also permit variants, which are collections of components. Thus, the ADI may be combined with a radar assembly and other equipment for a first aircraft variant. The ADI may also be combined with different radar or other equipment into a second aircraft variant. Thus, the components and underlying objects may be quickly reused to further improve the development process.

Returning to the content production tool 26, it may generate all variants within the system 10, or may generate only a single variant (or subset of all variants). The content production tool 26 also utilizes the build information associated with the various objects in the knowledge management module 18. The content production tool 26 may also use various content processors to assist in generating the virtual environment item 12.

The content production tool 26 may also generate documentation as it generates the reusable virtual environment item 12. For instance, object data may include meta data describing the data in a structured format. The content production tool 26 may utilize this information during the build process to generate system documentation or help files.

Figure 3:
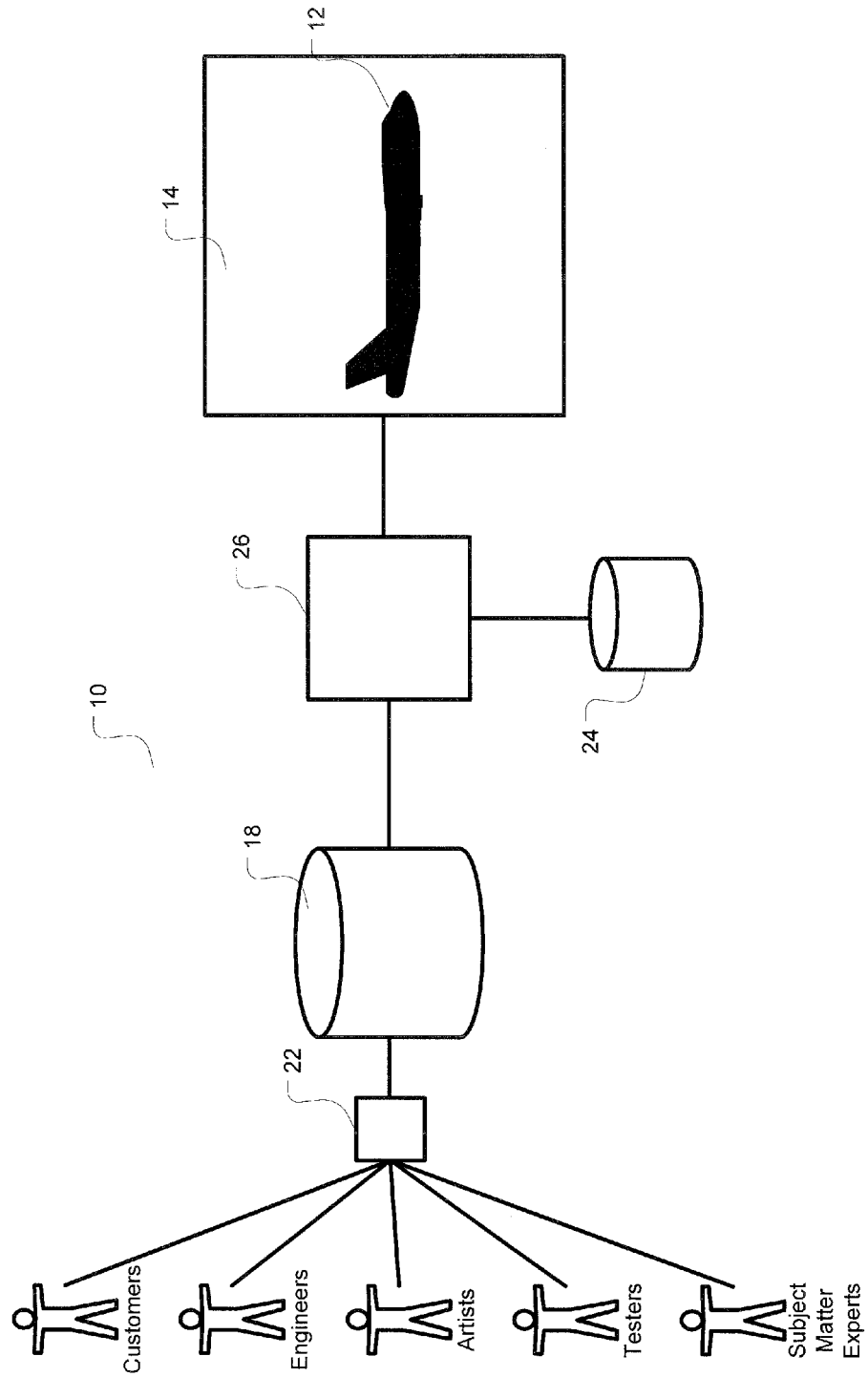
FIG. 3 is a block diagram illustrating one embodiment of a system in accordance with the teachings of the present disclosure.

FIG. 3 depicts the system 10 disclosed herein in an alternate embodiment. The system 10 includes a knowledge management module 18, a content production tool 26 and a single workspace 22. As shown in FIG. 3, the workspace 22 can be used by numerous subject developers at once. The workspace 22, as would be understood to one of skill in the art, would maintain consistency and data integrity by controlling which users accessed which data concurrently.

Figure 4:
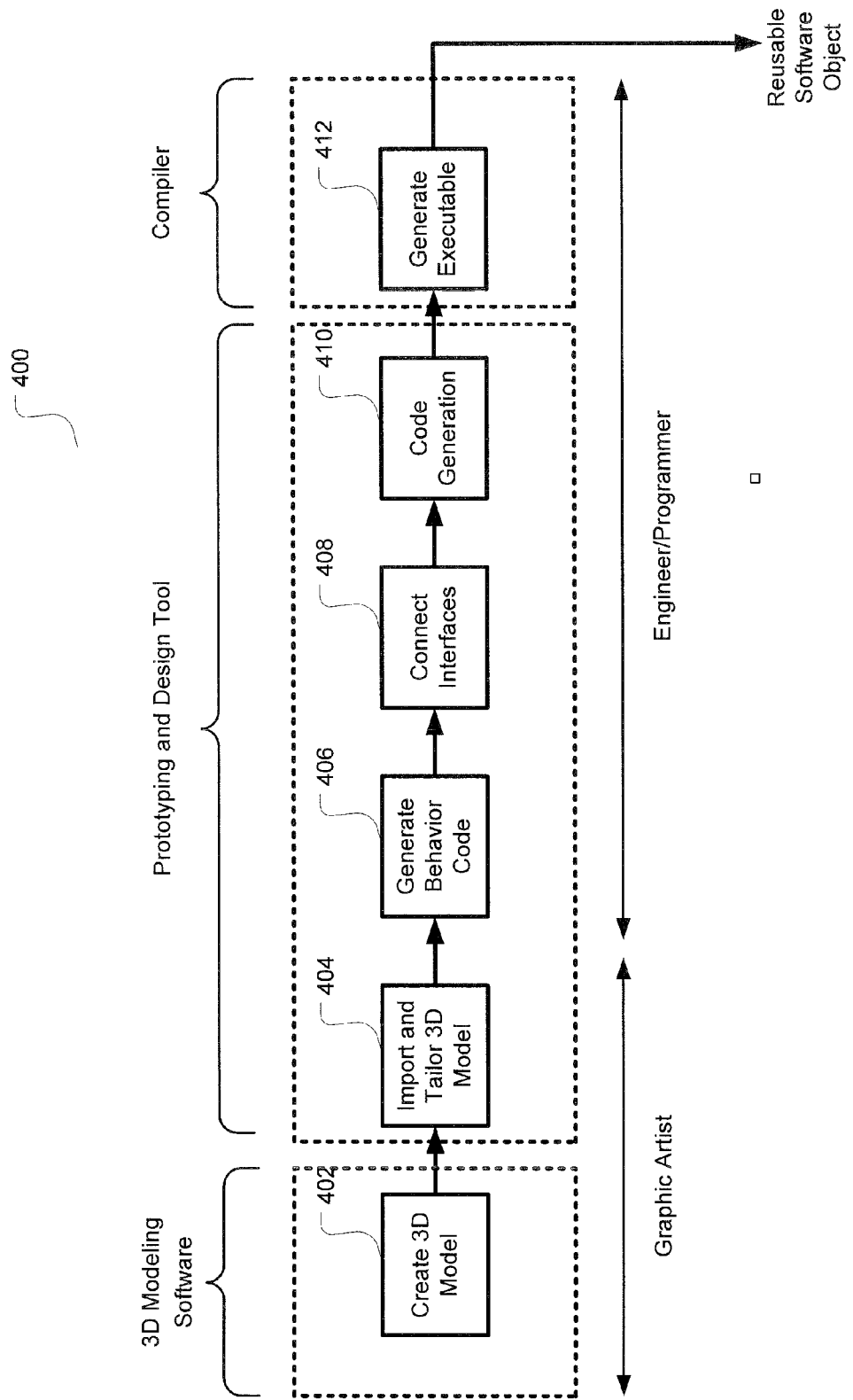
FIG. 4 is a block diagram illustrating a process for generating virtual environment items.

FIG. 4 depicts a process for generating reusable virtual environment items 12. First, a 3D model is created and then tailored to the desired environment item 12 at steps 402 and 404. Typically, a graphic artist would perform these steps. Next, code would be generated to implement how the item behaves at step 406. The item's interfaces are then connected to the other components of the system at step 410. Next code is generated for the object at step 410. Finally, the code would be compiled and built into an executable at step 412. Typically, an engineer would perform steps 406, 408, 410, and 412. Thus, when the artist needs to make refinements to the component, the engineer would potentially need to redo her work in order to regenerate the environment item 12.

Figure 5:
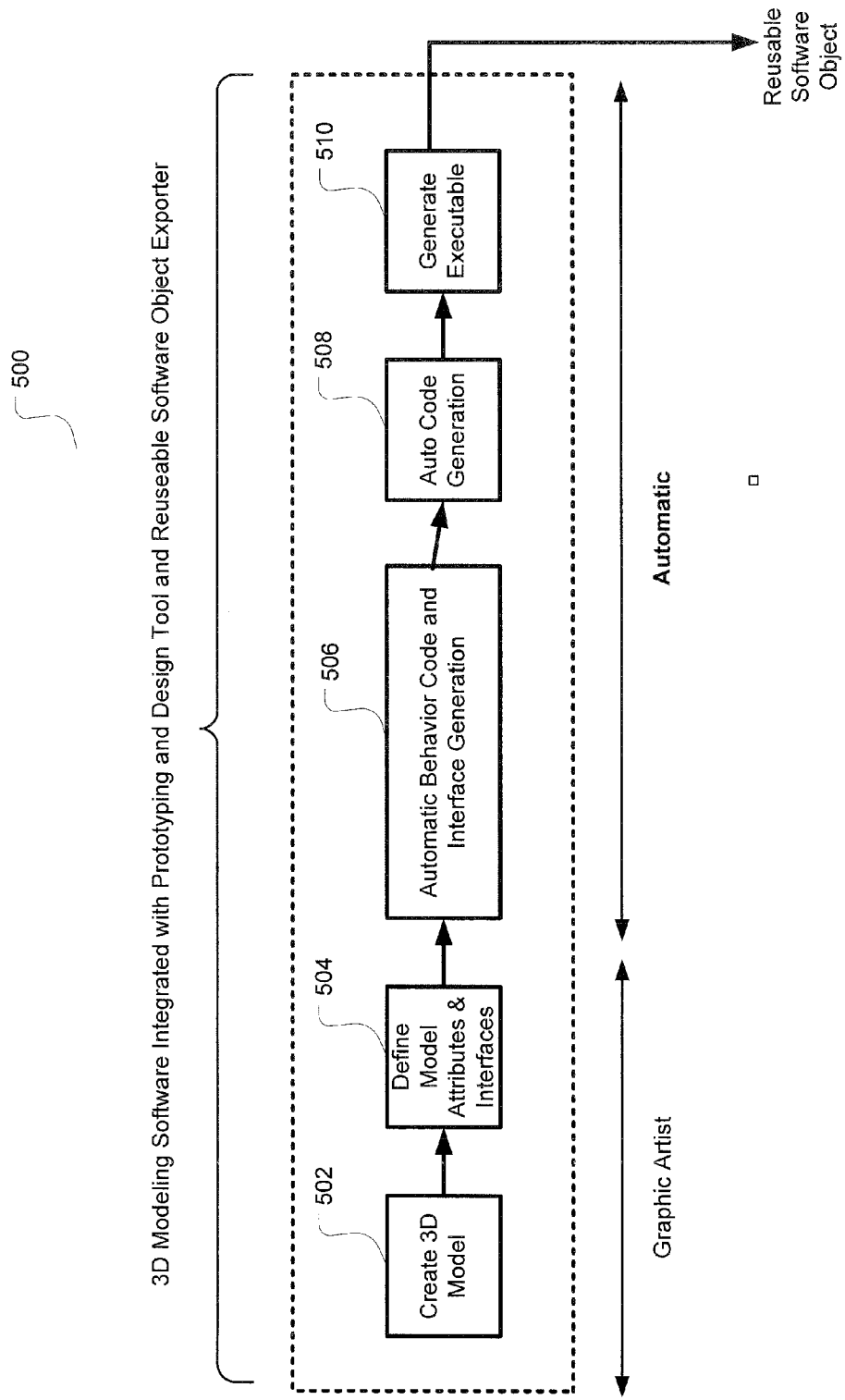
FIG. 5 is a block diagram illustrating a process for generating reusable virtual environment items in accordance with the teachings of the present disclosure.

FIG. 5 depicts the same process but with the teachings of the present disclosure. As with FIG. 4, the process begins with an artist creating a three-dimensional model at step 502. Next the graphic artist defines the model attributes and interfaces for the component at step 504. The artist can do that using the teachings of the present disclosure because the data is structure and presented so that the artist can input data relating to the behavior of the item because the item is of a pre-defined object class. Thus, an engineer has already previously defined what behaviors are available for the respective item, and the artist can select which of those behaviors she'd want.

Again, because the data is structured based on the pre-defined object class, the behavior code and interface can be automatically generated at step 506. Similarly, the code can be generated, compiled, and built at steps 508 and 510 without any additional engineering input. In a preferred embodiment, the prototyping and design tool used is GL STUDIO®, sold by DiSTI®.

FIG. 6 is another illustration of the content production tool 26. As shown, the content production tool 26 gathers object data 20 from the knowledge management module 18 and may combine that data with content stored in the content repository 24 to generate a reusable virtual environment item 12.

The knowledge management module 18, content repository 24 and content production tool 26 may each be on a separate computing system. Alternatively, one or more of them may be on the same computing system. They may communicate with one another using any communication capabilities.

Each computing system may include a computer processing unit communicatively coupled with a memory. Each computer processing unit may be a single central processing unit, or a number of processing units configured to operate either in sequence or in parallel. A processing unit may be configured to execute software processes which implement features of the system 10. Each memory may be any computer memory capable of storing the steps necessary for a processor to implement the features of the system 10 disclosed herein.

The system 10 can be implemented on one or more computing systems, which can include a personal computer, a workstation, a network computer, hand held device, or any other suitable processing device. Further, the system 10 can be written as a software program in any appropriate computer language, such as, for example, C, C++, C#, Java, Assembler, Tcl, Lisp, Javascript, or any other suitable language. In one embodiment, the system 10 is implemented as a web-based application.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system having a processor for generating a reusable virtual environment item to be integrated into a visual computer simulation wherein the reusable virtual environment item is generated using object data gathered from a plurality of developers, the system comprising:
a centralized knowledge management module for storing a plurality of objects wherein each object is of a pre-defined object class wherein the object class defines a structure for the object, an exporter for the object, a build setting for the object and a behavior for the object;
a plurality of distributed workspaces communicatively connected to the knowledge management module wherein each workspace gathers object class information from the knowledge management module, gathers object data from a developer such that the object data conforms to the object class, and provides the gathered object data to the knowledge management module;
a content repository operable to store graphical information relating to the objects stored in the knowledge management module;
a content production tool which builds the reusable virtual environment item by gathering a plurality of objects from the knowledge management module wherein for each gathered object, the content production tool uses the object's exporter to export the object data from the knowledge management module;
gathers graphical information related to the object from the content repository; and
generates the reusable virtual environment item using the build setting for the object wherein the reusable virtual environment item conforms to the behavior for the object.

2. The system of claim 1 wherein the content production tool comprises a build engine.

3. The system of claim 1 wherein the content production tool comprises a compiler.

4. The system of claim 1 wherein the computer simulation is an aircraft maintenance training simulation.

5. The system of claim 1 wherein the computer simulation is an aircraft simulator.

6. A method for generating a reusable virtual environment item to be integrated into a visual computer simulation wherein the reusable virtual environment item is generated using object data gathered from a plurality of developers, the method comprising the steps of:
storing a plurality of objects in a centralized knowledge management module, wherein each object is of a pre-defined object class, wherein the object class defines a structure for the object, an exporter for the object, a build setting for the object and a behavior for the object;
gathering object class information from the knowledge management module, gathering object data from a developer such that the object data conforms to the object class, and providing the gathered object data to the knowledge management module via a plurality of distributed workspaces communicatively connected to the knowledge management module;
storing in a content repository, graphical information relating to the objects stored in the knowledge management module;
building the reusable virtual environment item by gathering a plurality of objects from the knowledge management module wherein for each gathered object, using the object's exporter to export the object data from the knowledge management module;
gathering graphical information related to the object from the content repository; and
generating the reusable virtual environment item using the build setting for the object wherein the virtual environment item conforms to the object behavior.

7. The method of claim 6 wherein the generating step further comprises:
generating computer source code which implements the behavior of the object;
compiling the generated source code using the build settings; and
building an executable computer file from the compiled source code.

8. The method of claim 6 further comprising:
preparing a list of objects stored in the knowledge management module; and generating the virtual environment object using the list of objects stored in the knowledge management module.

9. The method of claim 6 wherein the distributed workspace communicates with the knowledge management module via a network.

10. The method of claim 6 wherein storing object data in the centralized knowledge management module comprises:
concurrently gathering via a plurality of distributed workspaces only the items specified in the object class.

11. The method of claim 10 wherein object data is gathered concurrently from an artist and an engineer.

* * * * *